United States Patent [19]

Rodgers et al.

[11] Patent Number: 5,207,054
[45] Date of Patent: May 4, 1993

[54] SMALL DIAMETER GAS TURBINE ENGINE

[75] Inventors: Colin Rodgers; Jack R. Shekleton; Anthony C. Jones, all of San Diego, Calif.

[73] Assignee: Sundstrand Corporation, Rockford, Ill.

[21] Appl. No.: 690,308

[22] Filed: Apr. 24, 1991

[51] Int. Cl.$^5$ .................. F02C 3/06; F02C 3/08
[52] U.S. Cl. ...................... 60/39.36; 60/751
[58] Field of Search .......... 60/39.36, 269, 726, 60/751; 415/143; 418/140

[56] References Cited

U.S. PATENT DOCUMENTS

| | | | |
|---|---|---|---|
| 2,650,060 | 8/1953 | Stalker . | |
| 2,945,349 | 7/1960 | Ritzi | 60/39.36 |
| 3,018,623 | 1/1962 | Birmann | 60/39.36 |
| 3,088,279 | 5/1963 | Diedrich | 60/39.36 |
| 3,118,278 | 1/1964 | Hill | 60/39.36 |
| 3,266,249 | 8/1966 | Simioni | 60/39.36 |
| 3,635,577 | 1/1972 | Dee | 60/39.36 |
| 3,861,826 | 1/1975 | Dean | 415/208.4 |
| 4,151,709 | 5/1979 | Melconian et al. | 60/39.36 |
| 4,167,097 | 9/1979 | Wosika et al. | 60/39.36 |
| 4,211,073 | 7/1980 | Guillot | 60/746 |
| 4,218,189 | 8/1980 | Pask | 416/219 R |
| 4,455,121 | 6/1984 | Jen | 415/143 |
| 4,794,754 | 1/1989 | Shekleton et al. | 60/39.36 |
| 4,821,506 | 4/1989 | Rodgers | 60/39.2 |
| 4,825,640 | 5/1989 | Shekleton | 60/39.36 |

OTHER PUBLICATIONS

SAE Technical Paper Series 892254–"Fast Start Ceramic Auxiliary Power Unit" by Tibor Bornemisza & Colin Rogers Sep. 1989.

Primary Examiner—Richard A. Bertsch
Assistant Examiner—Howard R. Richman
Attorney, Agent, or Firm—Wood, Phillips, VanSanten, Hoffman & Ertel

[57] ABSTRACT

The diameter of a gas turbine engine may be reduced through the use of a construction including a monorotor (44) journaled for rotation and mounting compressor blades (48) at one end (46) and turbine blades (56) at an opposite end (54). An axial diffuser (96) receives the discharge from the compressor blades (84) and is contained in a plenum (98). A reverse flow, annular combustor (83) is disposed about the rotor (44) and has a dome (100) whose height is a minor fraction of the axial length of the combustor (83) and which discharges to an annular turbine nozzle (77) having axial turbine nozzle blades (76).

23 Claims, 3 Drawing Sheets

SMALL DIAMETER GAS TURBINE ENGINE

FIELD OF THE INVENTION

This invention relates to an extremely small diameter, gas turbine, thrust producing engine which may be manufactured relatively inexpensively and which is suited for use in an environment that requires extremely small engine diameters.

BACKGROUND OF THE INVENTION

Most relatively small missiles in use today are propelled by solid fuel rockets as opposed to, for example, turbojet engines. The selection of a solid fuel rocket as a propulsion device has been largely dictated by two factors. First, in many instances, a turbine engine cannot be fabricated sufficiently economically as to compete with a solid fuel rocket engine. Secondly, in small size missiles, i.e., those having a relatively small diameter measured on the order of about six inches or less, it has heretofore been extremely difficult to manufacture an efficient turbojet engine that will fit within the envelope required for the propulsion unit for such a missile.

As a consequence of the resulting use of solid fuel rocket engines, some degree of control of the missile flight path or trajectory is lost over that which is available were it possible to propel the missile by a gas turbine engine whose output can be readily varied. Further, even if the gas turbine engine operates relatively inefficiently, the use of such an engine greatly extends the range of the missile.

Recently, in order to overcome the difficulties attendant the use of rocket engines, the assignee of the instant application has produced a gas turbine engine having a diameter of about six inches. These engines are disclosed in U.S. Pat. No. 4,794,754 issued Jan. 3, 1989 to Shekleton, et al and have been extremely successful in meeting the challenge of providing a propulsion unit for small diameter missiles. However, because the diameter of such an engine in effect sets the minimum frontal area for the missile, such engines have only been capable of use with missiles having diameters of six inches or more. Thus, while such engines have fulfilled a substantial need, there remains a need for an even smaller diameter, gas turbine, thrust producing engine; and the present invention is directed to fulfilling that need.

SUMMARY OF THE INVENTION

It is principal object of the invention to provide a new and improved small diameter gas turbine engine More specifically, it is an object of the invention to provide such an engine that may have a diameter of about four inches and which is ideally suited for use as a propulsion unit for small diameter missiles.

An exemplary embodiment of the invention achieves the foregoing objects in a gas turbine engine including a monorotor journaled for rotation and including opposed ends. One of the ends includes compressor blades defining a mixed flow rotary compressor while the other end includes turbine blades defining a radial turbine. An axial diffuser is located just radially outward of the monorotor and in fluid communication with the mixed flow rotary compressor to receive compressed air therefrom and a plenum contains the axial diffuser. A reverse flow annular combustor is disposed about the turbine wheel and within the plenum. The combustor has a dome height that is a minor fraction of its axial length and an outlet adjacent the turbine wheel. An annular turbine nozzle is located at the outlet and is in proximity to the turbine blades. The turbine nozzle is provided with axial nozzle blades.

As a result of the foregoing combination of elements, it is possible to fabricate an extremely small diameter gas turbine engine which may be useful for a wide range of applications including use as a starter motor.

In a preferred embodiment of the invention, the combustor includes a frusto-conical outer wall that diverges away from the axial diffuser Axially spaced air inlets from the plenum into the combustor are provided along the length thereof.

An exemplary embodiment of the invention contemplates the provision of a shroud in close proximity to the turbine blades to confine gases of combustion thereagainst. The radially inner sides of the nozzle blades are supported by the shroud A sleeve-like annular partition supports the radially outer sides of the nozzle blades and the partition further supports the axial diffuser oppositely of the nozzle.

In a highly preferred embodiment, the partition extends axially to a location about the monorotor between the compressor blades and the turbine blades and a labyrinth seal is located at such location to prevent gas flow across the monorotor. The labyrinth seal is carried by at least one of the partition and the rotor, and in a preferred embodiment, is carried solely by the partition.

In a preferred embodiment, the diffuser may be a two row, cascade diffuser

Preferably, the rotor, shroud, partition and nozzle blades are formed of ceramic to enable operation, at a higher than conventional turbine inlet temperature for an increase power output.

In a preferred embodiment, a gas discharge port is located in proximity to the compressor blades and directed thereat for directing a gas under pressure against the compressor blades to accelerate the monorotor during a starting sequence.

In a highly preferred embodiment, air is introduced into the annular combustor along with fuel primarily in the circumferential direction so as to provide for considerable swirl during combustion to achieve the residence time within the combustor necessary to assure complete combustion of the fuel prior to the gases passing through the turbine nozzle to be directed against the turbine wheel.

Preferably, the air inlets are defined by tubes which in turn have axes that are generally tangential to the space between the radially inner and outer walls. The tubes are located in at least two, and preferably three, axially spaced rows.

In one embodiment of the invention, the fuel injecting means inject fuel into the tubes to be entrained with air passing through the tubes.

Still a further object of the invention is to provide a new and unique means of at least counterbalancing thrust forces on the rotor. In a preferred embodiment, such means include the fuel pump for delivering fuel under pressure to the gas turbine engine as a means of generating a pressurized fluid, and a means on the rotor in opposition to the turbine blades thereon for receiving fuel under pressure.

In another embodiment of the invention, a partition such as mentioned previously which extends axially to a location about the monorotor between the compressor blades and the turbine blades is provided with a brush seal engaging the monorotor as an alternative to a labyrinth seal.

According to still a further facet of the invention, the reverse flow annular combustor includes a radially inner wall formed of ceramic material and which is integral with the rear engine shroud and which serves as an exhaust duct. The radially inner wall converges somewhat in the direction away from the turbine wheel and because the same forms the inner wall of the annular combustor, allows an increase in the dome height for increased power.

In this embodiment of the invention, a seal is disposed on the radially inner end of the radial wall or dome wall of the combustor to slidably engage the radially inner wall.

Other objects and advantages will become apparent from the following specification taken in connection with the accompanying drawings.

DESCRIPTION OF THE PREFERRED EMBODIMENT

Figure 1:
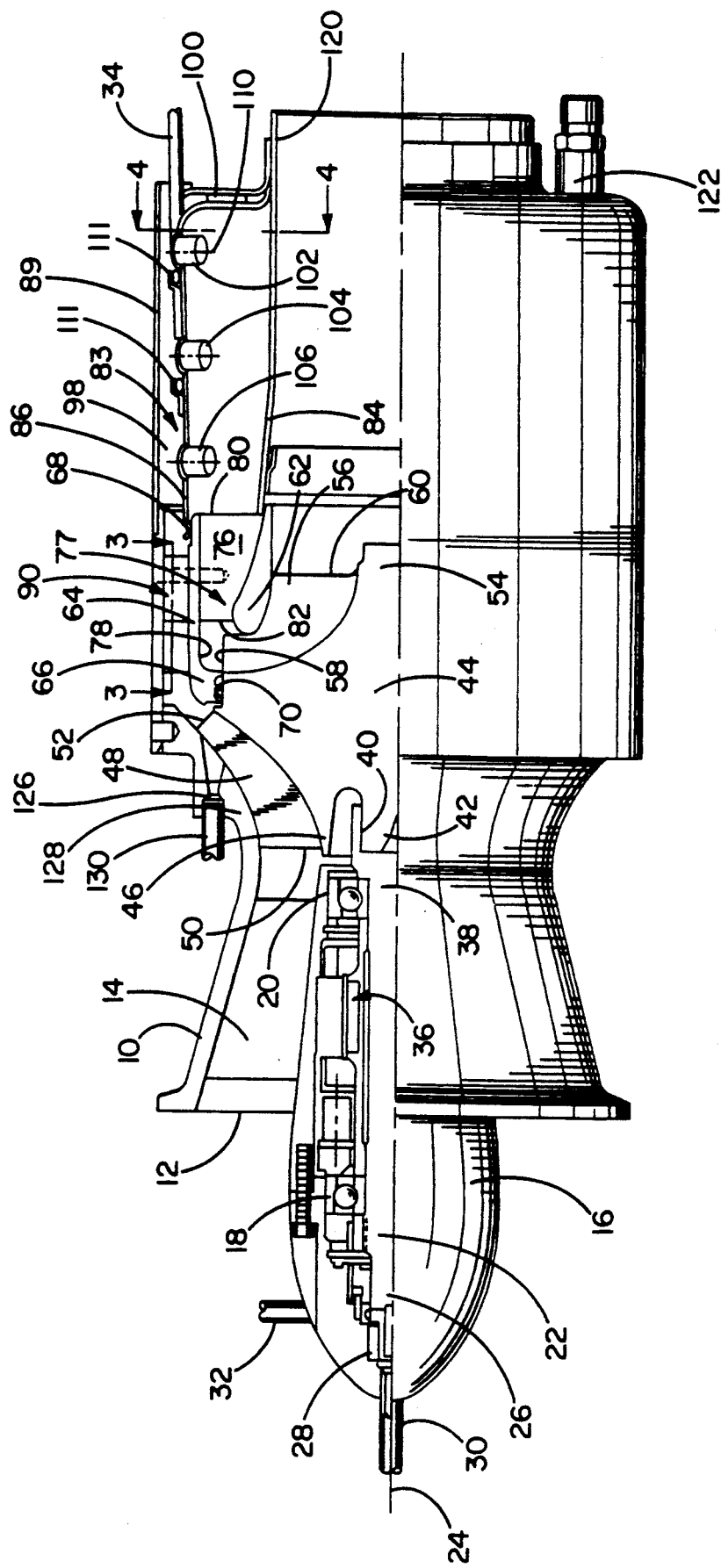
FIG. 1 is a sectional view of a small diameter gas turbine, thrust producing engine made according to the invention.

An exemplary embodiment of a small diameter gas turbine, thrust producing engine is illustrated in FIG. 1. Generally, the engine will be in a form of a thrust producing engine, but it should be understood that in some instances, the engine may be utilized in an environment where power is taken from a rotation shaft coupled to the rotor of the engine.

The gas turbine engine of the invention includes a bell shaped, air inlet housing 10 having a forwardly facing open end 12 through which air may enter the engine. A plurality of struts 14 (only one of which is shown) extend radially inwardly to support a bearing and accessory housing 16 centrally within the open end 12. The housing 16 includes axially spaced bearings 18 and 20 which journal a shaft 22 for rotation about an axis 24. One end 26 of the shaft is coupled to a fuel pump, generally designated 28, for the engine which is adapted to receive fuel on an inlet line 30 from a tank (not shown) and pump the fuel through an outlet 32 to a fuel control system (not shown) which in turn provides fuel for combustion within the engine to a fuel manifold 34 to be described in greater detail hereinafter.

Also contained within the housing 16 is a small permanent magnet generator, generally designated 36, which is utilized to generate electrical power for operating engine and missile controls (not shown).

The end 38 of the shaft 22 opposite the end 26 includes a recess 40 which receives a protuberance 42 on one end of an engine rotor 44. The rotor 44 is a so-called monorotor in that it is of one piece construction. Preferably, the same is cast of ceramic material so that the rotor will have a low mass and thus may be accelerated rather quickly during a starting sequence Ceramic material also allows a higher operation temperature for increased output. Preferably, the rotor 44 is brazed to the shaft 22 at the interface of the recess 40 and the protuberance 42.

An end 46 of the rotor 44 adjacent the protuberance 42 mounts a plurality of compressor blades 48. The blades 48 include an inlet edge 50 and discharge ends 52. As can be seen from FIG. 1, the blades 48 are configured to provide a mixed flow rotary compressor which is to say at the discharge end 52, the flow of compressed gas has appreciable or substantial radial components as well as axial components. This is in contrast to conventional gas turbine engines wherein compressor discharge is either substantially axial or substantially radial.

The end 54 of the rotor 44 opposite the end 46 mounts a plurality of turbine blades 56. The turbine blades 56 have inlet edges 58 which are generally parallel to the axis 24 and downstream edges 60 which typically, but not always, will be generally transverse to the axis 24. Those skilled in the art will immediately appreciate that the blades 56 having the configuration described define a radial turbine wheel.

Figure 2:
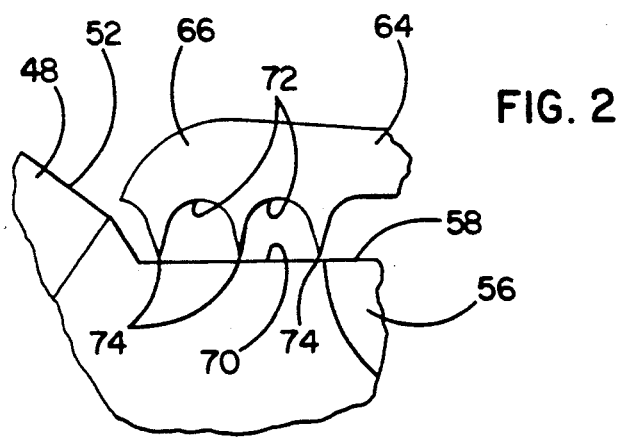
FIG. 2 is an enlarged, fragmentary sectional view of a seal employed in the engine.

Hot gases of combustion directed against the blades 56 are confined to the spaces between adjacent blades 56 by a rear shroud 62 which, as can be seen in FIG. 1, is axially elongated. Spaced radially outward of the shroud 62 is a sleeve-like partition 64 which is axially elongated and has opposed ends 66 and 68. One end 66 is in overrelying relation to a land 70 on the rotor 44 separating the compressor blades 48 from the turbine blades 56. As best seen in FIG. 2, a series of radially inwardly opening, annular grooves 72 are located in the radially inner side of the end 66 of the partition 64 and are separated by annular points or projections 74 that almost, but do not quite, contact the land 70. Thus, a labyrinth seal is defined at the interface of the partition end 66 and the land 70 and is carried by the partition 64.

The end 68 of the partition 64 extends axially the full length of the shroud 62 and a series of axially elongated turbine nozzle blades 76 are supported between the shroud 62 and the partition 64 to define an axial nozzle, generally designated 77. The axially elongated nozzle blades 76 direct hot gases of combustion axially through the space between the shroud 62 and the partition 64 against the blades 58 of the turbine wheel defined thereby to drive the same. In this connection, it will be observed that an annular, concave surface 78 is located intermediate the ends of the partition 64 to direct the axially flowing gases from the blades 76 radially against the turbine blades 56 at their inlet edges 58.

For reference purposes, attention is directed to commonly owned U.S. Pat. No. 4,821,506, issued Apr. 18, 1989, the teachings of which are expressly incorporated herein by reference.

The use of axially elongated blades 76 having leading edges 80 axially spaced from the trailing edges 82 in contrast to the conventional arrangement for nozzle blades in a radial turbine construction allows reduction of the engine diameter. In the conventional case, the trailing edges of the vanes would be radially inward of the leading edges and the outlet of a combustor would be radially outwardly of the leading edges. This adds sizably to the diameter of the machine in contrast to the configuration illustrated wherein a reverse flow, annular combustor, generally designated 83, includes a radially inner wall 84 joined to the shroud 62 and a radially outer wall 86 joined to the partition 64. The space between the radially inner and outer walls 84, 86 at the shroud 62 and the partition 64 define the outlet of the combustor 83 and it will be observed that such outlet has essentially the same radius as the turbine nozzle defined by the blades 76. This clearly illustrates how diametral compactness is achieved through the use of the axial blades 76.

Figure 3:
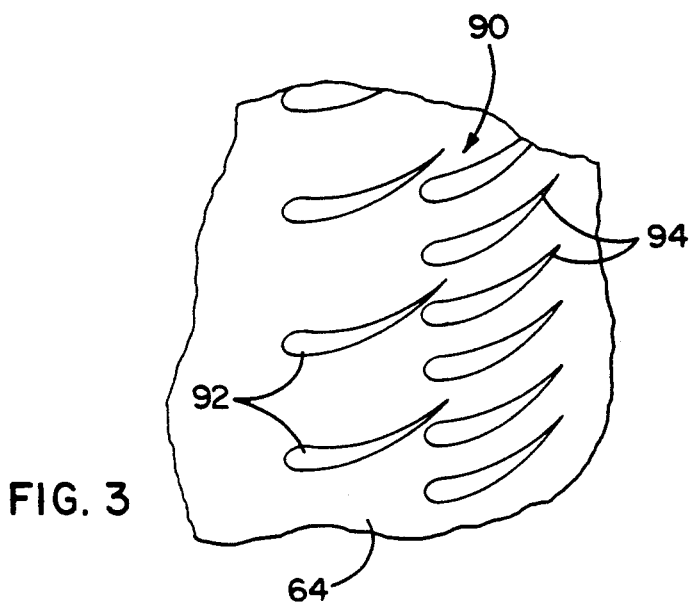
FIG. 3 is a fragmentary, enlarged, developed view taken approximately along the line 2—2 in FIG. 1.

A cylindrical engine case 89 surrounds the combustor 83 and is spaced radially outwardly therefrom. In the vicinity of the partition 64, the same supports, together with the partition 64, a two row, axial, cascade diffuser, generally designated 90. As can be seen in FIG. 3, the diffuser 90 includes a first row of vanes 92 which are upstream of a second row of vanes 94 and in close proximity to the discharge ends 54 of the compressor blades 48. The configuration of the vanes 92 and 94 may be achieved through conventional art and it will be observed that in the row of vanes 94, that is, the downstream row of vanes, there are twice as many of the vanes 94 as there are vanes 92 in the first row.

Such a configuration extends the stall range.

The case 89 extends about the radially outer wall 86 of the combustor 83 in spaced relation to define an annular plenum 98 which receives the discharge from the diffuser 90. As can be seen in FIG. 1, the combustor 83 is axially elongated and relatively narrow. A radially extending wall 100 interconnecting the radially inner and outer walls 84, 86 remote from the turbine nozzle blades 76 defines the so-called "dome" of the combustor 83 and it will be appreciated that the so-called dome height is but a minor fraction of the axial length of the combustor 83. In the illustrated embodiment, (which is approximately to scale in FIG. 1) the dome height is about ⅓ of the axial length of the combustor 83.

Three rows of air injection tubes 102, 104, 106 are axially spaced from one another and arranged to establish fluid communication through the radially outer wall 86 between the plenum 98 and the interior of the annular combustor 83. In a typical case, there will be perhaps four of the tubes 102 in a first row nearest the dome or radially extending wall 100, an equal number of the tubes 106 adjacent the nozzle 77 and a commensurate number of intermediate tubes 104 located between the rows of tubes 102 on the one hand and the rows of tubes 106 on the other.

In the usual case, ⅓ of the air introduced into the combustor 83 will enter through the tubes 106, another ⅓ through the tubes 104 and last the ⅓ through the tubes 102. The invention takes advantage of this feature of the combustor 83 to maximize the combustor volume. In particular, the radially outer wall 16 is somewhat frusto-conical, diverging outwardly toward the case 89 as one progresses toward the dome or radially extending wall 100. Thus, the plenum 98 progressively is narrowed, but such is entirely permissible since there is a considerably lesser volume of air flowing in the plenum 98 adjacent the row of tubes 102 than there is flowing adjacent the row of tubes 106. As is well known, the increased combustor volume allows the achievement of a greater power level without loss of stability in flame propagation.

Figure 4:
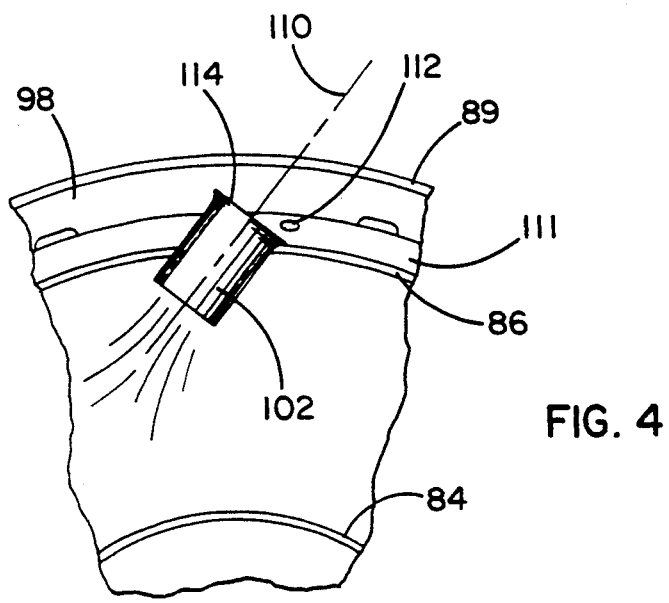
FIG. 4 is an enlarged, fragmentary sectional view taken approximately along the line 3—3 in FIG. 1.

Referring to FIG. 4, one of the tubes 102 and its relation to other components is illustrated and typifies the construction of the tubes 104 and 106 as well. The tube 102 has an axis 110 which is transverse to the rotational axis 24 as can be ascertained from FIG. 1 and which is tangential to the space between the radially inner and outer walls 84, 86 as can be seen in FIG. 4. The axes of the tubes 104 and 106 are similarly oriented. Thus, the air introduced into the combustor 83 via the tubes 102 will be moving circumferentially to create a swirling flame. As has been recognized in recent years, the use of swirl within the combustion chamber provides for a stable flame while minimizing the number of fuel injectors and provides the residence time needed to complete combustion in small size combustors by lengthening the path of the fuel and air mixture as combustion takes place.

Fuel manifolds 111 associated with the tubes 102 and 104 (FIG. 1) may have an aperture 112 (FIG. 4) aligned with the open end 114 of each of the tubes 102 and 104 within the plenum 98. As a result, fuel may be discharged into the air stream entering such tubes to be entrained therewith and directed along with air into the combustor 83. Alternatively, the opening 112 could be aligned with an aperture in the side of the corresponding tube 102 or 104 and inject fuel into the interior of the corresponding tube in that fashion as more fully disclosed in the previously identified Shekleton, et al. patent.

Returning to FIG. 1, the radially inner wall 84 of the combustor 83 may be extended past the radially extending wall 100. Such an extension is designated 120 and serves as an exhaust duct for the engine The wall 100 may likewise support a conventional ignitor 122 which will extend into the interior of the combustor 83 to achieve ignition therein.

For starting purposes, a gas discharge port 126 may be located in a continuation 128 of the inlet housing 10 which additionally serves as a shroud for the compressor blades 48. A conduit 130 may be connected to a source of high pressure gas or the like and when such gas is allowed to flow through the opening 126, it will impinge against the blades 48 to rapidly accelerate the rotor 44 to a speed whereat ignition may be had and stably maintained.

With fuel being injected at two axially spaced locations by the two different manifolds 111, it will be appreciated that high power densities are present within the combustor 83. The greatest density will tend to be in the vicinity of the leading edges of the blades 76, that is, just downstream of the tubes 106 since typically the last of the air required to achieve stoichiometric combustion will be added at that location. In other words, full heat release will not occur until all fuel has been burned and that in turn will not occur until the nozzle 77 is encountered. Thus, it is highly preferable that both the partition 64 and the shroud 62 as well as the blades 76 be formed of ceramic materials. As a consequence, the turbine inlet temperature may be increased to achieve a higher thrust. In the usual case, monolithic silicon nitride will be employed in fabricating the rotor 44 while either silicon nitride or silicon carbide may be utilized in forming the shroud 62, the partition 64 and the blades 76.

Figure 5:
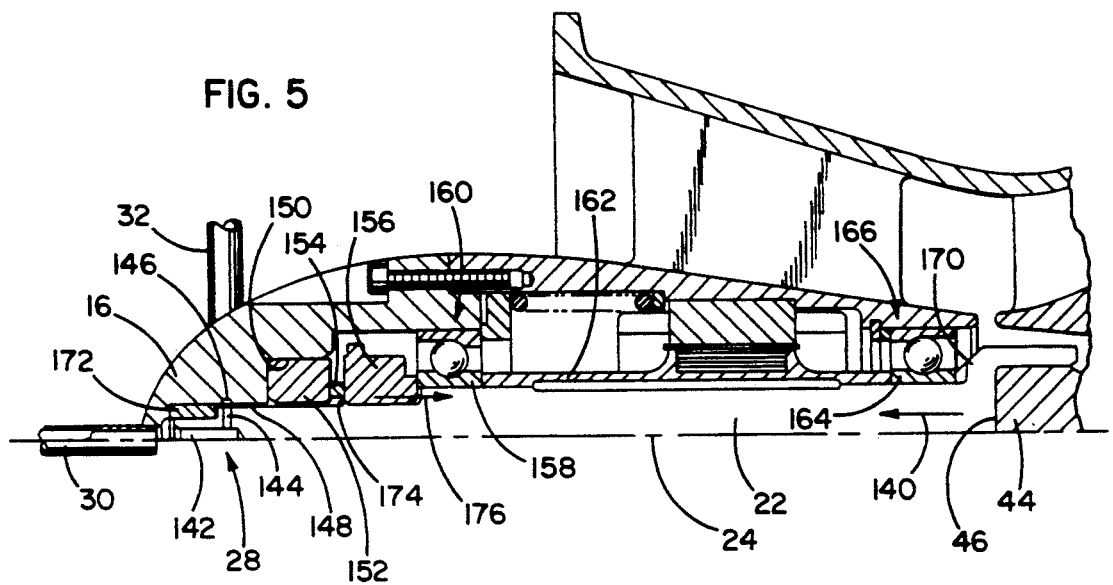
FIG. 5 is an enlarged, fragmentary sectional view of the inlet end of a gas turbine engine made according to the invention and illustrating a means whereby axial thrust on the rotor may be counterbalanced by fuel under pressure.

Turning now to FIG. 5, a unique means by which axial thrust generated by the turbine wheel within the engine is at least partially offset will be described. Those skilled in the art will readily appreciate that such thrust is acting in the direction of an arrow 140 along the axis 24 of the shaft 22.

The fuel pump 28 is a so-called "drilled hole" fuel pump and includes an axial bore 142 in the end of the shaft 22 adjacent the inlet 30 and located on the axis 24. A series of drilled holes 144 extend radially from the bore 142 and are in axial alignment with a collection annulus 146 formed in a bore 148 within the housing 16, the bore 148 receiving the shaft 22. The collection annulus 146 will, of course, be in fluid communication with the outlet 32. During engine operation, fuel pressure up to about 250 psi are generated by the pump 28.

A step 150 in the bore 148 receives a conventional cartridge seal 152 which in turn is engaged by a circular carbon seal 154 sandwiched between the cartridge seal 152 and a nut 156 threaded on the shaft 22 so as to engage the inner race 158 of a bearing, generally designated 160. The opposite side of the inner race 158 is engaged by a sleeve 162 which engages the inner race 164 of a bearing, generally designated 166 that is located adjacent the inlet to the compressor section of the rotor 44 at the end 46 thereof. The opposite side of the inner race 164 is engaged by a step 170 on the shaft 22.

A carbon seal 172 is located on the side of the collection annulus 146 remote from the carbon seal 154. As can be appreciated from the clearances illustrated in FIG. 5 fuel under pressure at the interface of the bore 148 and the shaft 22 will be contained by the carbon seals 154 and 172. However, such fuel under pressure will act against the left hand face 174 of the nut 156 at a location radially inward of the carbon seal 154. Thus, the pressure of the fuel acting against such area provides a counterbalancing force for the axial thrust represented by the arrow 140. This counterbalancing force is ultimately applied to the shaft 22 at the shoulder 170 by reason of the mechanical structure including the nut the inner race 156, the sleeve 162 and the inner race 164.

The force is designated by an arrow associated with the nut 156 and labeled 176. Note that the total counterbalancing force can be appropriately selected by judicious selection of the inner diameter of the carbon seal 154. The larger the inner diameter of the seal 154, the greater the area of the face 174 that is exposed to fuel under pressure with the result that the force ultimately applied in the direction of the arrow 176 will be increased in proportion to the increase in area which in turn is increased in proportion to the inner diameter of the carbon seal 154.

Figure 6:
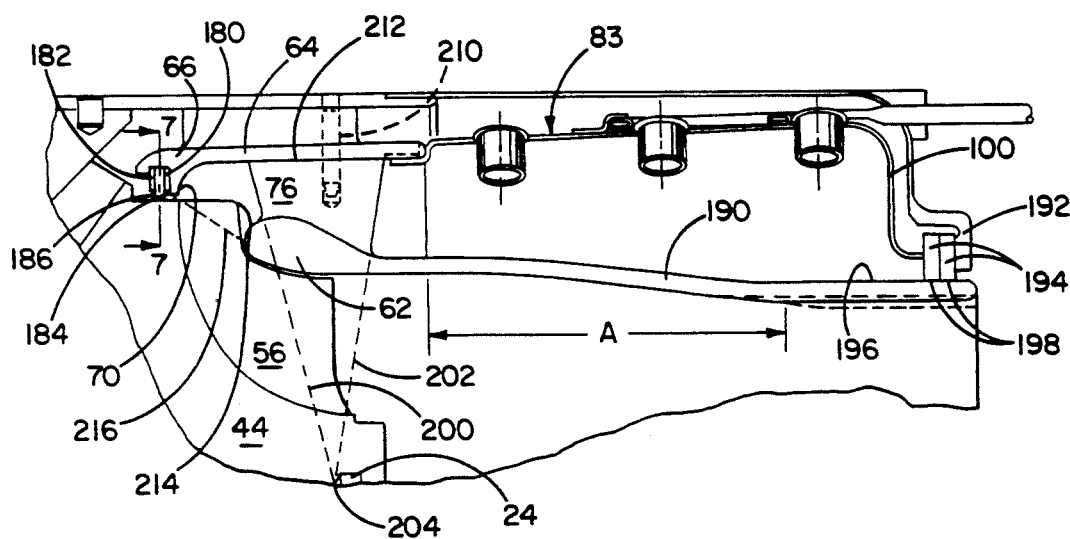
FIG. 6 is a view similar to FIG. 5, but of the outlet or exhaust end of the engine.
Figure 7:
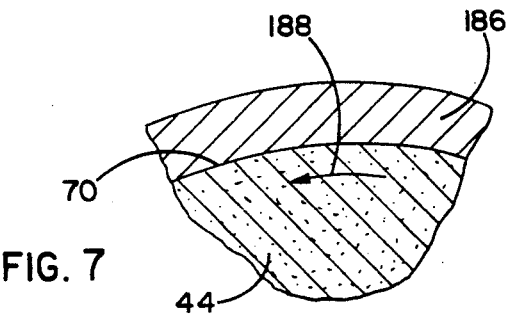
FIG. 7 is a fragmentary, sectional view taken approximately along the lines 7—7 in FIG. 6.

FIGS. 6 and 7 show further and preferred embodiments of the invention. In lieu of the labyrinth seal defined by the grooves 72 and points 74, a resilient seal may be provided to contact the land 70 on the rotor 44. As seen in FIG. 6, the resilient seal is in the form of a brush seal which in turn is defined by a pair of piston rings 180 and 182 received in a radially inward opening groove 184 formed in the end 66 of the partition 64. Sandwiched between the piston rings 180 and 182 is a brush seal made up of a plurality of metal wire filaments 186 (FIG. 7) which are tightly packed and which extend at about a 45° angle into rubbing contact with the land 70. The angle of 45° is in respect to the direction of rotation of the rotor 44 as indicated by an arrow 188 in FIG. 7.

The invention also contemplates that the metal radially inner wall 84 of the combustor 83 be replaced by a ceramic radially inner wall 190. As illustrated in FIG. 7, it is preferable that the radially inner wall 190 be of one piece or integral construction with the rear shroud 62.

The radially inner wall 190 thus serves as an exhaust duct and turbine thrust nozzle for the turbine exhaust as well as the radially inner wall for the combustor 83. It will be particularly observed that along a section of its length designated A in FIG. 6, the duct thus defined progressively narrows as the distance from the rotor 44 increases. The thickness of the radially inner wall 190, however, remains generally the same over this area, so the net result is a further increase in the so-called dome height of the combustor 83 to achieve the known advantages associated with increases in dome height.

The radial wall 100, in connection with any suitable mounting bracket such as shown at 192 mounts side by side ceramic piston rings 194. In the area of the piston rings 194, the outer surface 196 of the radially inner wall 190 is cylindrical and is in engagement with the radially inner sides 198 of the piston rings 194. Thus, a sliding seal is provided to accommodate differences in thermal expansion in the various parts of the combustor 83.

Two lines 200 and 202 extending from a point 204 on the rotational axis 24 and encompassing the leading and trailing edges of the nozzle vanes or blades 76 somewhat schematically illustrate another feature of the invention. It is preferred that all surfaces of each blade 76 fall on the lines 200 or 202 or other like lines that extend to the point 204. This provides a maximum width in the blades 76 without changing the length to chord ratio where the assembly is by pinning the blades 76 tot he partition 64 with pins 210 (only one of which is shown). Generally speaking, if bonding between the partition 64 and the radially outer ends 212 of the blades 76 is contemplated, then it is desirable that the vane length be maximized to provide a maximum area whereat the bond may be achieved.

It is also desirable that the blades 56 defining the turbine wheel have noses such as shown at 214 in FIG. 6 as this improves the efficiency over a construction where, for example, the inlet end of the blades 56 were to follow a line such as the dotted line 216 that extends directly to the shroud 62.

From the foregoing, those skilled in the art will readily appreciate that the unique blend of a mixed flow compressor, an axial diffuser and an axial turbine nozzle provide a means whereby the diameter of the engine case 89 may be minimized. The invention enables a diameter of as little as four inches to be obtained with a thrust output on the order of fifty pounds. Thus, the invention is ideally suited for use as a readily controllable, long range propulsion unit for small diameter missiles or the like.

We claim:

1. A gas turbine engine comprising:
   a monorotor journaled for rotation and including opposed ends, one of said ends including compressor blades defining a mixed flow rotary compressor, the other of said ends including turbine blades defining a radial turbine wheel;
   an axial diffuser just radially outward of said monorotor and in fluid communication with said mixed flow rotary compressor to receive compressed air therefrom;
   a plenum containing said axial diffuser;
   a reverse flow annular combustor concentric with said turbine wheel and within said plenum, said combustor having a dome height that is a minor fraction of its axial length, and an outlet adjacent said turbine wheel; and an annular turbine nozzle at said outlet and in proximity to said turbine blades, said turbine nozzle having axial nozzle blades.

2. The gas turbine engine of claim 1 wherein said combustor includes a frusto-conical outer wall that diverges away from said axial diffuser; and
axially spaced air inlets from said plenum into said combustor along the length thereof.

3. The gas turbine engine of claim 1 wherein a shroud is in close proximity to said turbine blades to confine gases of combustion thereagainst, the radially inner sides of said nozzle blades are supported by said shroud; and further including a sleeve-like annular partition supporting the radially outer sides of said nozzle blades, said partition further supporting said axial diffuser oppositely of said nozzle.

4. The gas turbine engine of claim 1 wherein a shroud is in close proximity to said turbine blades to confine gases of combustion thereagainst and the radially inner sides of said nozzle blades being supported by said shroud; and further including a sleeve-like annular partition supporting the radially outer sides of said nozzle blades, said partition extending axially to a location about said monorotor between said compressor blades and said turbine blades, and a seal carried by said partition at said location to prevent gas flow across said monorotor thereat.

5. The gas turbine engine of claim 4 wherein said seal is a labyrinth seal.

6. The gas turbine engine of claim 4 wherein said seal is a brush seal having filaments in contact with said monorotor.

7. The gas turbine engine of claim 1 wherein said diffuser is a two row cascade diffuser.

8. The gas turbine engine of claim 1 wherein said monorotor is formed of ceramic material.

9. The gas turbine engine of claim 1 further including a gas discharge port directed at said compressor blades for directing a gas under pressure thereat to accelerate said monorotor during a starting sequence.

10. A gas turbine engine comprising:
a monorotor journaled for rotation and including opposed ends, one of said ends including compressor blades defining a mixed flow rotary compressor, the other of said ends including turbine blades defining a radial turbine wheel;
an axial diffuser just radially outward of said monorotor and in fluid communication with said mixed flow rotary compressor to receive compressed air therefrom;
a plenum containing said axial diffuser;
a reverse flow annular combustor concentric with said turbine wheel and within said plenum having radially inner and outer walls connected by a dome;
an annular turbine nozzle at said outlet and in proximity to said turbine blades, said turbine nozzle having axial nozzle blades; and
a rear turbine shroud, shrouding said turbine blades;
said radially inner wall and said rear turbine shroud being formed as an integral, one piece unit so that said radially inner wall additionally defines a turbine exhaust nozzle, said turbine exhaust nozzle narrowing in the direction away from said rear turbine shroud to maximize the height of said dome.

11. The gas turbine engine of claim 10 wherein said one piece unit is formed of ceramic and said combustor includes a radially extending wall between said radially inner and outer walls, and a seal on said radially extending wall slidably and sealingly engaging said radially inner wall remote from said rear turbine shroud.

12. A gas turbine engine comprising:
a monorotor including opposed ends, one of said ends including compressor blades defining a mixed flow rotary compressor, the other of said ends including turbine blades defining a radial turbine wheel;
an axial diffuser just radially outward of said monorotor and in fluid communication with said mixed flow rotary compressor to receive compressed air therefrom,
a plenum containing said axial diffuser;
a reverse flow annular combustor having an outlet about said turbine wheel and within said plenum;
an annular turbine nozzle at said outlet and in proximity to said turbine blades, said turbine nozzle having axial nozzle blades;
a housing including a bore adjacent said one end of said monorotor;
a shaft in said bore journaling said monorotor for rotation;
a fuel pump driven by said shaft for providing fuel under pressure; and
a pressure responsive surface associated with said shaft within said housing and in fluid communication with said fuel pump, said surface being oppositely facing from said monorotor other end so that pressurized fuel applied to said surface will generate a force in opposition to thrust force generated at said monorotor other end.

13. The gas turbine engine of claim 12 wherein a circular seal surrounds said shaft and engages said pressure responsive surface to confine pressurized fuel thereagainst, the inner diameter of said seal being variable to vary said force in opposition.

14. A gas turbine engine comprising:
a rotor journaled for rotation and including a compressor end and an opposite turbine end;
compressor blades on said compressor end and having discharge ends, the compressor blades at said discharge ends having substantial radial and axial components to define a mixed flow rotary compressor;
turbine blades on said turbine end and having radially outer gas receiving ends to define a radial turbine;
a shroud in close proximity to said turbine blades along the length thereof for confining gases thereagainst;
a sleeve-like partition spaced radially outward of said shroud;
axially elongated nozzle blades extending between said shroud and said partition adjacent the radially outer ends of said turbine blades to define an annular turbine nozzle;
an annular combustor having inner and outer walls respectively joined to said shroud and said partition on an end thereof opposite from said turbine blades; and a radially extending wall interconnecting said inner and outer walls and remote from said annular nozzle;
a plurality of axially spaced air inlets to said combustor located in said radially outer wall and disposed to introduce air generally circumferentially into said combustor;
means for injecting fuel into said combustor in a generally circumferential direction;

a combustor case disposed about and spaced radially outward of said radially outer wall; and a diffuser including a plurality of axially disposed vanes near said discharge ends and supported between said partition and said combustor case.

15. The gas turbine engine of claim 14 wherein said compressor and turbine ends of said rotor are separated by a land and said partition includes an end in overlying relation to said land; and further including a labyrinth seal on said partition end in facing relation to said land to prevent gas flow across said rotor.

16. The gas turbine engine of claim 14 wherein said combustor case is cylindrical and said radially outer wall diverges toward said combustor case as said radial wall is approached.

17. A gas turbine engine comprising:

a rotor journaled for rotation and including a compressor end and an opposite turbine end spaced by a land;

compressor blades on said compressor end and having discharge ends, the compressor blades at said discharge ends having substantial radial and axial components to define a mixed flow rotary compressor;

turbine blades on said turbine end and having radially outer gas receiving ends to define a radial turbine;

a shroud in close proximity to said turbine blades along the length thereof for confining gases thereagainst;

a sleeve-like partition spaced radially outward of said shroud and having an end in overlying relation to said land;

a labyrinth seal located on at least one of said partition end and said land to prevent gas flow across said rotor;

axially elongated nozzle blades extending between said shroud and said partition adjacent the radially outer ends of said turbine blades to define an annular turbine nozzle;

an annular combustor having inner and outer walls respectively joined to said shroud and said partition on an end thereof opposite from said turbine blades; and a radially extending wall interconnecting said inner and outer walls and remote from said annular nozzle, said radially outer wall diverging away from said radially inner wall as said radially extending wall is approached;

a plurality of axially spaced air inlets to said combustor located in said radially outer wall and disposed to introduce air generally circumferentially into said combustor;

means for injecting fuel into said combustor in a generally circumferential direction;

a cylindrical combustor case disposed about and spaced radially outward of said radially outer wall; and a diffuser including a plurality of axially disposed vanes near said discharge ends and supported between said partition and said combustor case.

18. The gas turbine engine of claim 17 wherein said rotor is a monorotor.

19. The gas turbine engine of claim 17 wherein said diffuser is a two vane row, cascade diffuser wherein in the number of vanes in the downstream row is at least twice the number of vanes in the upstream row.

20. The gas turbine engine of claim 17 wherein said air inlets are defined by tubes having axes generally tangential to the space between said radially inner and outer walls and there are at least two axially spaced rows of said tubes.

21. The gas turbine engine of claim 20 wherein said fuel injecting means inject fuel into said tubes to be entrained with air passing through said tubes.

22. The gas turbine engine of claim 21 wherein there are three axially spaced rows of said tubes.

23. The gas turbine engine of claim 21 wherein said fuel injecting means inject fuel into the tubes of two of said axially spaced rows.

* * * * *